United States Patent Office 3,277,039
Patented Oct. 4, 1966

3,277,039
OIL AND WATER REPELLENT COMPOSITIONS
Frank Joseph Marascia, Newark, and Stuart Raynolds, Wilmington, Del., assignors to E. I. du Pont de Nemours and Company, Wilmington, Del., a corporation of Delaware
No Drawing. Filed Sept. 26, 1963, Ser. No. 311,656
6 Claims. (Cl. 260—29.6)

This invention is directed to oil- and water-repellent compositions. More particularly, it is concerned with novel oil- and water-repellent compositions which comprise mixtures of fluorinated polymers and vinyl copolymers, as hereinafter described.

Copending application Serial No. 288,894, filed June 19, 1963, is commonly assigned and describes and claims oil- and water-repellent compositions comprising a mixture of a fluorinated polymer containing

$$CH_2=C(CH_3)CO_2CH_2CH_2C_nF_{2n+1}$$

and a vinyl polymer prepared from at least one polymerizable vinyl compound free of non-vinylic fluorine. While these compositions heretofore defined and claimed in said copending application are very useful oil- and water-repellents for a variety of substrates, when used either alone or in conjunction with certain textile treating agents such as melamine resin treating agents described in U.S. Patent 2,783,231, and temperatures of the machine running parts (guide rolls and drying cans) exceed a temperature of about 120° F., they dry to a gummy mass on the rolls. If the temperatures do not exceed this temperature, the gummy mass does not form and no difficulties are encountered. The gummy mass which accumulates on the guide rolls and cans is difficult to remove.

It is, therefore, an object of the present invention to provide novel oil- and water-repellent compositions, said compositions comprising mixtures of fluorinated polymers or copolymers with vinyl copolymers as hereinafter described and claimed.

Another object is to provide novel oil- and water-repellent compositions as hereinafter defined, which compositions do not gum up guide rolls and drying cans at temperatures in excess of 120° F.

A still further object is to provide a novel process for treating fibrous or porous materials with these compositions for the purpose of rendering them oil- and water-repellent.

These and other objects of the present invention will be apparent from the following description and claims.

More specifically, the present invention is directed to a polymer composition comprising (1) from about 3% to about 60% by weight of a polymer of a polymerizable compound of the structure $$CH_2=C(CH_3)CO_2CH_2CH_2C_nF_{2n+1}$$

wherein $n$ has a value of from 3 to 14 and (2) from about 40% to about 97% by weight of a copolymer of a polymerizable monovinyl compound free of non-vinylic fluorine and from about 0.05% to about 10% by weight of said copolymer of a polymerizable nonconjugated divinyl compound free of non-vinylic fluorine.

The present invention is also directed to a polymer composition comprising (1) a fluorinated copolymer of (a) from about 25% to about 99.8% by weight of said fluorinated copolymer of a polymerizable fluorine-containing compound of the structure $$CH_2=C(CH_3)CO_2CH_2CH_2C_nF_{2n+1}$$

wherein $n$ is from 3 to 14 and (b) from 0.2% to about 75% by weight of said fluorinated copolymer of at least one polymerizable monovinyl compound free of non-vinylic fluorine and (2) a vinyl copolymer of a polymerizable monovinyl compound free of nonvinylic fluorine and from about 0.05% to about 10% by weight of said vinyl copolymer of a polymerizable nonconjugated divinyl compound free of non-vinylic fluorine, the weight proportions of said fluorinated copolymer and said vinyl copolymer being such that the mixture contains at least 3% by weight of said polymerizable fluorine-containing compound component.

This invention relates to polymeric products comprising from about 3% to about 60% by weight of a fluorinated polymer prepared from at least one polymerizable fluorine-containing compound of structure

$$CH_2=C(CH_3)CO_2CH_2CH_2C_nF_{2n+1}$$

wherein $n$ is from 3 to 14 (referred to hereinafter as the fluorinated polymer) and from 40% to 97% by weight of a vinyl copolymer of at least one polymerizable monovinyl compound free of non-vinylic fluorine and from about 0.05% to about 10% by weight, based on the weight of the vinyl copolymer, of a non-conjugated divinyl compound free of non-vinylic fluorine (referred to hereinafter as the vinyl copolymer). The monovinyl compound free of non-vinylic fluorine is chosen from

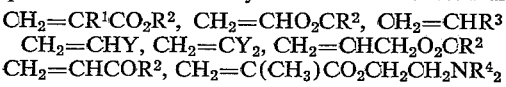
$$CH_2=CR^1CO_2R^2,\ CH_2=CHO_2CR^2,\ CH_2=CHR^3$$
$$CH_2=CHY,\ CH_2=CY_2,\ CH_2=CHCH_2O_2CR^2$$
$$CH_2=CHCOR^2,\ CH_2=C(CH_3)CO_2CH_2CH_2NR^4_2$$
$$CH_2=CR^1CONHCH_2OH,$$

1,3-butadiene, 2-chloro-1,3-butadiene or isoprene where $R^1$ is H or methyl, $R^2$ is a saturated alkyl group containing from one to 18 carbons, $R^3$ is phenyl or alkyl substituted phenyl, $R^4$ is H or a saturated alkyl group of one to 6 carbons and Y is fluorine, chlorine or bromine. 1,3-butadiene and its derivatives are considered monovinyl compounds for the purposes of this invention because these conjugated dienes polymerize as a unit. The nonconjugated divinyl compounds free of non-vinylic fluorine are chosen from

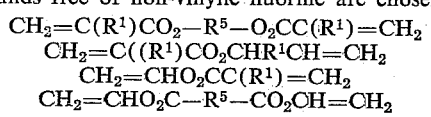
$$CH_2=C(R^1)CO_2-R^5-O_2CC(R^1)=CH_2$$
$$CH_2=C((R^1)CO_2CHR^1CH=CH_2$$
$$CH_2=CHO_2CC(R^1)=CH_2$$
$$CH_2=CHO_2C-R^5-CO_2CH=CH_2$$

and $$CH_2=C(R^1)-R^6-C(R^1)=CH_2$$ wherein $R^5$ is a divalent saturated alkylene group containing from two to about ten carbons having the two unsaturated substituents attached to different carbons, and $R^6$ is a divalent phenyl or alkyl substituted phenyl group.

Another embodiment of the present invention is a polymer composition which is a mixture of (a) at least one fluorinated copolymer comprising from about 25% to about 99% by weight of at least one polymerizable fluorine-containing compound

$$CH_2=C(CH_3)CO_2CH_2CH_2C_nF_{2n+1}$$

and from 1% to about 75% by weight of at least one polymerizable monovinyl compound free of non-vinylic fluorine (referred to hereinafter as the fluorinated copolymer) and (b) a copolymer prepared from at least one polymerizable monovinyl compound free of non-vinylic fluorine and from about 0.05% to about 10% by weight of a nonconjugated divinyl compound free of non-vinylic fluorine (the vinyl copolymer); the weight proportion of said fluorinated copolymer and said vinyl copolymer being such that the mixture contains at least 3% by weight of the component

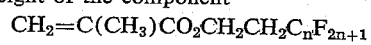
$$CH_2=C(CH_3)CO_2CH_2CH_2C_nF_{2n+1}$$

This invention also is directed to a process for treating fibrous or porous materials for the purpose of imparting oil- and water-repellency thereto which comprises impregnating said materials with an aqueous bath containing from about 0.1 to about 10% by weight of a composition as defined and, by any convenient means, expressing the excess liquid therefrom to effect a dry pickup of between 0.1 and 10% on weight of fabric of total

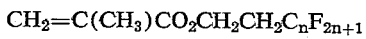

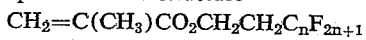

solids, said pick-up being equivalent to at least about 0.03% on weight of fabric of the fluorinated monomer, and heating the expressed material at from about 165° C. to about 195° C. for at least 15 seconds.

This invention, as heretofore described, is related to the invention described and claimed in the herein identified copending application Serial No. 288,894, filed June 19, 1963, which is a continuation-in-part of application Serial No. 107,330, filed May 3, 1961 now abandoned. In the invention of said copending application, the fluorinated polymer of copolymer as defined above is combined with a vinyl polymer to obtain the oil- and water-repellent composition. The vinyl polymer is prepared from the types of monovinyl compounds or conjugated dienes described above but contains none of the non-conjugated divinyl compounds disclosed above. As noted earlier, the oil- and water-repellent compositions of said copending application give highly successful results under most conditions but form gummy masses in combination with certain other textile treating agents such as those described in U.S. Patent 2,783,231.

By using the vinyl copolymers of the present invention in place of the vinyl polymers of said copending application, the formation of gummy masses is unexpectedly avoided. The present invention, therefore, represents both a technical and novel improvement over the invention of said copending application. It should be understood, however, that the oil- and water-repellent compositions of the present invention are not limited to use with other textile treating agents such as those of U.S. Patent 2,783,231, but may be used alone to render substrates oil- and water-repellent if so desired.

The fluorinated polymers of the polymerizable compound $CH_2=C(CH_3)CO_2CH_2CH_2C_nF_{2n+1}$ contain the recurring unit

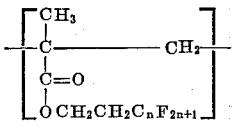

It is to be understood that $n$ may be the same or different in various recurring units contained in the polymer chain. Thus, the polymer can be a homopolymer of, for example, $C_8F_{17}CH_2CH_2O_2CC(CH_3)=CH_2$, a copolymer of, for example $C_6F_{13}CH_2CH_2O_2CC(CH_3)=CH_2$ and $C_9F_{19}CH_2CH_2O_2CC(CH_3)=CH_2$ or a terpolymer of, for example, $C_6F_{13}CH_2CH_2O_2CC(CH_3)=CH_2$, and $\quad C_8F_{17}CH_2CH_2O_2CC(CH_3)=CH_2$
$\quad C_{10}F_{21}CH_2CH_2O_2CC(CH_3)=CH_2$ The group $C_nF_{2n+1}$ contains from three to 14 carbons; examples of this group are n-$C_3F_7$—, n-$C_4F_9$—, n-$C_5F_{11}$—, n-$C_6F_{13}$—, n-$C_7F_{15}$—, n-$C_8F_{17}$—, n-$C_9F_{19}$—, n-$C_{10}F_{21}$—, n-$C_{12}F_{25}$— and n-$C_{14}F_{29}$—. The fluorinated copolymers contain the above repeating units as well as those derived from vinyl monomers.

The methacrylate esters $$CH_2=C(CH_3)CO_2CH_2CH_2C_nF_{2n+1}$$

may be prepared from the alcohols $C_nF_{2n+1}CH_2CH_2OH$ which undergo ready esterification with methacrylic acid or trans esterification with alkyl methacrylates, i.e.

(1)
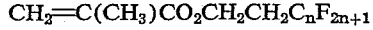
$C_nF_{2n+1}CH_2CH_2OH + CH_2=C(CH_3)CO_2H \xrightarrow{H^+}$
$\quad C_nF_{2n+1}CH_2CH_2O_2CC(CH_3)=CH_2$ (2)
$C_nF_{2n+1}CH_2CH_2OH + CH_2=C(CH_3)CO_2CH_3 \xrightarrow{H^+}$
$\quad C_nF_{2n+1}CH_2CH_2O_2C(CH_3)=CH_2 + CH_3OH$ The alcohols $C_nF_{2n+1}CH_2CH_2OH$ can also be esterified by reaction with methacrylyl chloride. An alternate method of preparing these esters is reaction (3) which follows:

(3) $C_nF_{2n+1}CH_2CH_2I + CH_2=C(CH_3)CO_2Ag$
$\rightarrow C_nF_{2n+1}CH_2CH_2O_2CC(CH_3)=CH_2$ The iodides $C_nF_{2n+1}CH_2CH_2I$ are prepared by reacting $C_nF_{2n+1}I$ with ethylene (see Haszeldine et al. J. Chem. Soc., 1949, 2856; 1950, 3041 and Park et al., WADC 56–590, part II, ASTIA 151014; J. Org. Chem., 23, 1166 (1958)). The iodides $C_nF_{2n+1}I$ are available by the methods of Haszeldine et al. (Nature, 167, 139 (1951); J. Chem. Soc., 1953, 3761) and Brice and Simons (J.A.C.S. 73, 4016 (1951)).

The alcohols $C_nF_{2n+1}CH_2CH_2OH$ are known, see Pierce et al., J.A.C.S. 75, 5618 (1953); Park et al., J. Org. Chem. 23, 1166 (1958). The method used by Pierce et al. and Park et al. to prepare these alcohols is as follows:

(4) $C_nF_{2n+1}CH_2CH_2I + AgO_2CCH_3$
$\rightarrow C_nF_{2n+1}CH_2CH_2O_2CCH_3$ (5)
$C_nF_{2n+1}CH_2CH_2O_2CCH_3 + H_2O \xrightarrow{H^+} C_nF_{2n+1}H_2OHCHC_3$ Another route discovered for preparing these alcohols involves the following steps as disclosed by Brace, J. Org. Chem., 27, 3033 (1962).

(6)
$C_nF_{2n+1}I + CH_2=CHO_2CCH_3 \xrightarrow{catalyst} C_nF_{2n+1}CH_2CH_2IO_2CCH_3$ (7)
$C_nF_{2n+1}CH_2CHIO_2CCH_3 + Zn \xrightarrow[C_2H_5OH]{HCl} C_nF_{2n+1}CH_2CH_2OH$ The fluorinated polymers of these methacrylate monomers are readily prepared using bulk, solution, suspension and emulsion techniques. Initiation can be accomplished by any of the known art methods commonly employed for methacrylate polymerizations.

Although the fluorinated polymers of this invention can be used alone as water- and oil-repellents, it has been discovered that it is far more advantageous to use these fluorinated polymers as mixtures with vinyl copolymers of vinyl monomers free of non-vinylic fluorine. The advantage gained is that relatively small amounts of the fluorine containing methacrylate polymer can be used with major amounts of the other cheaper vinyl copolymer with results that are actually superior to the fluorinated polymers themselves. It has also been discovered that the mixture of homopolymers is superior to a copolymer of the two types of monomers. The mixture of fluorinated methacrylate polymers with the vinyl copolymers is applied to substrates by essentially standard techniques which are well known to the art.

The fluorine-containing monomers utilized according to the present invention have the structure $$CH_2=C(CH_3)CO_2CH_2CH_2C_nF_{2n+1}$$

and preferably contain a polyfluoroalkyl group $F(CF_2)_n$ wherein $n$ is from 3 to about 14. When $n$ is one or two, good repellencies are not obtained. When $n$ is greater than 14, the polymeric products become less useful since they are not readily polymerized and serve no useful purpose over those wherein $n$ is 14 or less. The preferred species are 1H,1H,2H,2H-nonafluorohexyl methacrylate, 1H,1H,2H,2H-tridecafluorooctyl methacrylate, 1H,1H, 2H,2H-heptadecafluorodecyl methacrylate and 1H,1H, 2H,2H-henicosafluorododecylmethacrylate.

The vinyl copolymers are prepared, as indicated hereinbefore, by polymerizing together a vinyl compound free of non-vinylic fluorine and a nonconjugated divinyl compound free of non-vinylic fluorine. The copolymer contains from 0.05% to 10% by weight of the divinyl compound, 0.1% to 5% is preferred. Less than 0.1% of the divinyl compound does not prevent the formation of the gummy mass described hereinbefore. More than about 10% of the divinyl compound causes the vinyl copolymer to become increasingly more insoluble and less useful in the oil- and water-repellent compositions of this invention.

The polymerizable vinyl compounds free of nonvinylic fluorine which may be used in this invention include alkyl acrylates and methacrylates, vinyl esters of aliphatic acids, styrene and alkyl styrenes, vinyl halides, vinylidene halides, allyl esters, vinyl alkyl ketones, certain acrylamides and 1,3-butadiene and its derivatives. Representative examples include: methyl acrylate and methacrylate, propyl acrylate and methacrylate, butyl acrylate and methacrylate, isoamyl acrylate and methacrylate, 2-ethylhexyl acrylate and methacrylate, octyl acrylate and methacrylate, octadecyl acrylate and methacrylate, lauryl acrylate and methacrylate, cetyl acrylate and methacrylate, N,N-diethylaminoethyl acrylate and methacrylate, vinyl acetate, vinyl propionate, vinyl caprylate, vinyl laurate and vinyl stearate, styrene, α-methylstyrene, p-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylol acrylamide, N-methylol methacrylamide, glycidyl acrylate and glycidyl methacrylate.

The preferred vinyl monomer class of the above group is the alkyl methacrylates. It is often preferable to include a small amount of N-methylol acrylamide as a copolymer with the alkyl methacrylates since durability is increased thereby. The preferred alkyl methacrylates are n-butyl, n-amyl, n-hexyl, isoamyl, 2-ethylhexyl, n-heptyl and n-octyl methacrylates. Styrene, 2,3-dichloro-1,3-butadiene and alkyl acrylates are also quite useful in the present invention but generally less preferable than the methacrylates.

Esters of acrylic and methacrylic acid are well known and, in many cases, commercially available materials, e.g. methyl, ethyl, butyl, 2-ethylhexyl acrylates and methyl, ethyl, butyl, isobutyl, hexyl, octyl, decyl, lauryl, stearyl, N,N-diethylaminoethyl methacrylates. All are readily prepared by esterification of the alcohol and acid in the presence of an acid catalyst.

Vinyl acetate, vinyl 2-ethylhexanoate and vinyl stearate are commercially available. The others are readily prepared by reaction of vinyl acetate with the desired acid in the presence of mineral acid or by reaction of the desired acid with acetylene in the presence of a catalyst.

Styrene, alkyl styrenes, butadiene, chlorobutadiene, dichlorobutadiene and isoprene are well known, commercially available compounds. Vinyl and vinylidene halides are also well known and commercially available.

Allyl esters are also well known and many are commercially available, e.g. allyl caproate, allyl caprylate, allyl heptanoate, allyl isovalerate and allyl propionate. Methyl vinyl ketone is well known and commercially available. Other alkyl vinyl ketones may be prepared by the reaction of methyl alkyl ketones with formaldehyde in the presence of sulfuric acid. Methylol acrylamide is also commercially available.

The nonconjugated divinyl compounds free of non-vinyl fluorine must contain two polymerizable vinyl groups. Each vinyl group must polymerize independently of the other; that is, the two vinyl groups cannot polymerize together as a unit such as occurs in conjugated divinyl compounds such as 1,3-butadiene or substituted 1,3-butadienes. These divinyl compounds may be acrylic type esters of alkanediols, divinyl esters of alkanedioic acids, vinyl esters of acrylic type acids, allylic esters of acrylic type acids divinyl substituted aromatic compounds and similar related compounds. Representative examples include ethylene glycol diacrylate and dimethacrylate, 1,3-propylene glycol diacrylate and dimethacrylate, tetramethylene glycol diacrylate and dimethacrylate, pentamethylene glycol diacrylate and dimethacrylate, hexamethylene glycol diacrylate and dimethylacrylate, decamethylene glycol diacrylate and dimethylacrylate, diethylene glycol diacrylate and dimethacrylate, divinyl succinate, divinyl adipate, divinyl suberate, divinyl benzene, divinyl toluene, vinyl acrylate and methacrylate, vinyl α-chloroacrylate and allyl acrylate and methacrylate. These divinyl monomers seem to provide cross-linking in the vinyl copolymer. The cross-linking seems to prevent formation of the gummy mass previously described.

The novel water- and oil-repellent compositions of this invention comprise a mixture of a fluorinated polymer and a vinyl copolymer as hereinbefore defined. The fluorinated polymer may consist of one or more fluorine-containing monomers or of one or more of the fluorine-containing monomers copolymerized with a vinyl monomer free of non-vinylic fluorine. In the latter case, the polymer consists of about 25% to about 99% by weight of the fluorine-containing monomers. If the fluorine-containing polymer contains less than about 25% by weight of the fluorine-containing monomer, poor repellencies (or no repellency) are obtained.

It is necessary that the polymer mixture contain at least 3% by weight of the fluorine-containing monomer; 15% is preferred if the compositions are used alone, 40% if other adjuvants are present. At lower concentrations, unsatisfactory repellencies are obtained. The upper limit of 60% placed on the fluorine-containing monomer is determined by economic considerations, under some conditions as much as 95% of the fluorinated monomer gives useful results.

There is a distinct advantage obtained when a small amount of N-methylol acrylamide is included in either the fluorinated polymer or vinyl copolymer. The advantage is that the compositions thus obtained are more durable on fabrics than those which do not contain these compounds.

The molecular weight of both the fluorinated polymer and the vinyl copolymers is not a controlling factor as useful repellents are obtained over a wide range of molecular weights of both types of polymers.

It should be noted that the fluorinated monomers herein described do not have fluorine attached to the carbon atoms of the polymerizable vinyl group but only in the groups attached to the vinyl group. For the purposes of this invention, monomers containing fluorine attached only to the carbons of the vinyl group (e.g. vinyl fluoride and vinylidene fluoride) are not considered to be fluorinated monomers.

In the practice of this invention, the fluorinated monomer and the vinyl and divinyl monomers are polymerized separately, generally by an emulsion polymerization technique. The latexes of the fluorine-containing polymer and vinyl copolymer are then mixed together in the desired proportions and applied to the substrate. The fluorinated and vinyl monomers may be copolymerized and resulting latex is mixed with a vinyl copolymer latex in the desired proportions.

In general, the compositions of this invention may be prepared by any of the known techniques for emulsion polymerization of vinyl compounds. The process will be carried out in a reaction vessel fitted with a stirrer and external means of either heating or cooling the charge. The monomer or monomers to be polymerized together are emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. These include 2,2'-azodiisobutyramidine dihydrochloride, 2,2'-azodiisobutyronitrile, 2,2'-azobis(2,4-dimethyl-4-methoxyvaleronitrile), sodium peroxide, barium peroxide, hydrogen peroxide, ammonium persulfate, potassium persulfate and the like. The concentration of the catalyst for the polymerization is usually between 0.1% and 2% based on the weight of the monomers.

The surface active agents employed to stabilize the emulsion during its makeup and polymerization are anionic, cationic, or non-ionic emulsifying agents, but preferably they are the cationic or non-ionic type. Representative anionic emulsifying agents are alkyl ($C_{10}$ to $C_{18}$)-sodium sulfate, sodium alkyl ($C_{12}$ to $C_{18}$)-benzenesulfonate, sodium alkylnaphthalenesulfonate, the sodium salt of sulfated alkenyl ($C_{16}$ to $C_{18}$) acetate, sodium oleate, the sodium salt of sulfated methyl oleate, ammonium ω-H-polyfluoroalkanoate ($C_8$ to $C_{10}$), and ammonium perfluoroalkanoate. The cationic agents that may be employed include docedyltrimethylammonium acetate, trimethyltetradecylammonium chloride, hexadecyltrimethylammonium bromide, trimethyloctadecylammonium chloride, (dodecylmethylbenzyl)trimethylammonium chloride, benzyldodecyldimethylammonium chloride, N-[2 - (diethylamino)ethyl]oleamide hydrochloride. Nonionic surface active agents that may be employed include condensation products of ethylene oxide with hexylphenol, isooctylphenol, hexadecanol, oleic acid, alkane ($C_{12}$–$C_{16}$) thiol, alkyl($C_{12}$–$C_{18}$) amines and the like. In addition, small amounts of chain transfer agents may be present during the polymerization, such as, for example, an alkanethiol of 4 to 12 carbon atoms.

Suitable substrates for the application of the compositions of this invention are films, fibers, yarns, fabrics, and articles made from filaments, fibers, or yarns derived from natural, modified natural, or synthetic polymeric materials or from blends of these other fibrous materials and other porous materials which will absorb and transport low surface tension liquids either on their surfaces or in their interstices by capillary action.

Specific representative examples of suitable substrates are cotton, silk, regenerated cellulose, nylon, fiber-forming linear polyesters, fiber-forming polyacrylonitrile, cellulose nitrate, cellulose acetate, ethyl cellulose, paper, fiber, glass, wood, pressed or otherwise hardened wood composites, metals, unglazed porcelain, porous concrete and the like. Dyed and undyed cotton sateen, poplin, broadcloth, jean cloth, gabardine and the like are especially adaptable for treatment with the compositions of this invention to provide products having a high repellency to oil and water and being relatively unaffected by the action of heat, air and light. Materials rendered oil- and water-repellent by the invention polymer compositions retain a portion of the original repellent when laundered and dry cleaned.

The compositions are applied preferably as an aqueous dispersion by brushing, dipping, spraying, padding, rollcoating or by any combination of these methods. For example, the prepared concentrated dispersion of polymer composition may be used as a pad bath by diluting it with water to a solids content of 0.1 to 10% by weight of the bath. The textile material, or paper if desired, is padded in this bath, and is then freed of excess liquid, usually by squeeze rolls, so that the dry pickup (weight of the dry polymer on fiber) is between about 0.1 and 10% by weight of the fiber. The treated material is then heated at 165° to 195° C. for at least about 15 seconds to impart maximum durability of the agent on the material. The resulting textile material or paper will be found to be resistant to water and oil, and the textile material will retain its resistance to such agents even after many launderings and dry cleanings. The polymer may, if desired, be dispersed in liquids other than water.

Other methods for applying the compositions include the use of solutions in place of dispersions and stepwise deposition of the two polymers. Application from solution is carried out in the same ways, in general, as the application of dispersions. Stepwise application involves deposition of the two polymers separately, usually the nonfluorinated polymer first. Each polymer may be applied either as a dispersion or solution by any of the means described and a curing step may be used after both steps, if desired. The cure after the second application is necessary.

The following representative examples illustrate the present invention.

The alcohols $C_nF_{2n+1}CH_2CH_2OH$ were prepared by the method of Brace hereinbefore cited in this specification.

EXAMPLE I

This example illustrates the general method of preparation of $CH_2=C(CH_3)CO_2CH_2CH_2C_nF_{2n+1}$.

31.0 parts of methyl methacrylate, 21.4 parts of 1H,1H,2H,2H-heptafluoropentanol-1, 0.6 part of phenothiazine and 1.1 parts of concentrated sulfuric acid were charged into a reactor fitted with a nitrogen inlet, a stirrer, a thermometer and a helices-packed distillation column topped by a fractionation head which carefully controlled the reflux ratio. The mixture was agitated under nitrogen and heated to 100° C. The reflux ratio was adjusted so that the head temperature did not exceed 90° C. The composition of the distillate (methanol and methyl methacrylate) and reaction mixture was followed by gas chromatography. Conversion was 90% in 6–7 hours. The reaction mixture was then cooled and washed with 100 part portions of water until acid free. Fractionation of the mixture gave 24 parts (85% yield) of 1H,1H,2H, 2H-heptafluoropentyl methacrylate, $$CF_3CF_2CF_2CH_2CH_2O_2CC(CH_3)=CH_2$$

B.P. 66–68° C./20 mm., $n_D^{25}$ 1.3566.

*Analysis.*—Calculated for $C_9F_7H_9O_3$: C, 38.3; H, 3.19; F, 47.1. Found: C, 38.7; H, 3.20; F, 47.0.

Using the same procedure, the following other esters were prepared:

$CF_3(CF_2)_6CH_2CH_2O_2CC(CH_3)=CH_2$, B.P. 57–58° C./ 0.4 mm. $n_D^{25}$ 1.3438.

$CF_3(CF_2)_7CH_2CH_2O_2CC(CH_3)=CH_2$, B.P. 60–70°/0.1 mm., $n_D^{25}$ 1.3412.

$CF_3(CF_2)_3CH_2CH_2O_2CC(CH_3)=CH_2$, B.P. 60–62°/5 mm., $n_D^{25}$ 1.3530.

$CF_3(CH_2)_5CH_2CH_2O_2CC(CH_3)=CH_2$, B.P. 60–63°/1.0 mm., $n_D^{25}$ 1.3465.

$CF_3(CF_2)_9CH_2CH_2O_2CC(CH_3)=CH_2$, B.P. 95–100°/0.1 mm., M.P. 46–50° C. (wax like).

EXAMPLE II

The polymerization was run at 65° C. for six hours with the following recipe added in the order shown:

| | Parts |
|---|---|
| Water | 30.0 |
| Trimethyloctadecylammonium bromide | 1.0 |
| 1H,1H,2H,2H-heptadecafluorodecyl methacrylate | 10.0 |
| Acetone | 5.0 |
| Azodiisobutyramidine dihydrochloride | 0.2 |

The solids content of the resulting latex was about 20%.

In like manner, any of the other monomers of Example I is polymerized.

EXAMPLE III

The polymerization was run at 60° C. for six hours with the following recipe added in the order shown:

| | Parts |
|---|---|
| Water | 2200 |
| Dimethyloctadecylamine | 30 |
| Glacial acetic acid | 18.3 |
| 1H,1H,2H,2H-perfluoroalkyl methacrylate[1] | 1000 |
| n-Butyl acrylate | 20 |
| N-methylolacrylamide | 5 |
| Acetone | 1000 |
| Azodiisobutyramidine dihydrochloride | 0.4 |

[1] Consisted of $F(CF_2)_nCH_2CH_2O_2CC(CH_3)=CH_2$ wherein n 6, 8, 10 in the ratio 3:2:1 respectively with small amounts of n=12 and 14.

EXAMPLE IV

This example illustrates the preparation of typical crosslinked vinyl polymers.

The polymerization was run at 70° C. for four hours with the following recipe added in the order shown:

| | Parts |
|---|---|
| Water | 2200 |
| Dimethyloctadecylamine | 20 |
| Glacial acetic acid | 12.2 |
| 2-ethylhexyl methacrylate | 950 |
| N-methylolacrylamide | 18 |

| | Parts |
|---|---|
| Ethylene dimethacrylate (5%) | 50 |
| Acetone | 237 |
| Sodium chloride | 0.7 |
| Azobisisobutyramidine dihydrochloride | 0.222 |

The product is an emulsion of the polymer in water.

Similar polymers were prepared using the following in place of the 50 parts ethylene dimethacrylate of this Example IV:

| | Parts |
|---|---|
| Ethylene dimethacrylate (0.1%) | 1 |
| Ethylene dimethacrylate (0.2%) | 2 |
| Ethylene dimethacrylate (0.35%) | 3.4 |
| Ethylene dimethacrylate (0.5%) | 5.0 |
| Ethylene dimethacrylate (2.5%) | 25 |
| Ethylene dimethacrylate (10%) | 100 |
| Divinylbenzene (0.1%) | 1 |
| Divinylbenzene (1.0%) | 10 |
| Divinylbenzene (5%) | 50 |
| Divinylbenzene (10%) | 100 |
| Propylene dimethacrylate (0.1%) | 1 |
| Propylene dimethacrylate (1%) | 10 |
| Propylene dimethacrylate (10%) | 100 |
| Pentylene dimethacrylate (0.1%) | 1 |
| Pentylene dimethacrylate (1%) | 10 |
| Pentylene dimethacrylate (10%) | 100 |
| Vinyl acrylate (0.1%) | 1 |
| Vinyl acrylate (1.0%) | 10 |
| Vinyl acrylate (10%) | 100 |
| Allyl acrylate (0.1%) | 1 |
| Allyl acrylate (1.0%) | 10 |
| Allyl acrylate (10%) | 100 |

EXAMPLE V

Mixtures of the fluorinated polymers of Example III and the various nonfluorinated cross-linked polymers of Example IV were prepared as emulsions containing various weight ratios of fluorinated and nonfluorinated polymers. A series of pad-baths was prepared from these polymer mixtures according to the recipe below. Then samples (8 x 8 inch) of cotton poplin and 50:50 cotton-"Dacron" blend ("Dacron" is Du Pont's trade name for polyethylene terephthalate fiber) were padded with each of the pad-baths and then passed through a squeeze roll adjusted so that the squeezed fabric contained 60% of its own weight of the pad-bath contents (60% wet pickup). The fabric samples were then air dried for at least 45 minutes and then oven cured for 2 to 3 minutes at 175° C.

The fabric samples treated as described were tested for water-repellency using A.A.T.C.C. Standard Test Method 22–1952 of the American Association of Textile Chemists and Colourists. A rating of 100 denotes no water penetration or surface adhesion, a rating of 90 denotes slight random sticking or wetting and so on.

The oil-repellency test comprises placing a drop of test solution carefully on the textile on a flat horizontal surface. After two minutes, any penetration or wicking into the fabric is noted visually. To aid in the observation, the test solutions contained a small amount of oil-soluble blue dye to increase visibility. The nature of the test solutions is shown below; Nujol, of course, is a purified petroleum oil. Anything with a rating of 5 or greater is good or excellent; anything with a rating of 1 or over can be used for certain purposes. As an example, if a treated fabric repels the No. 1–6 solutions but not the number 7 solution, its rating is 6.

| Oil-Repellency Rating | Test Solution | Surface Tension, dynes/cm. at 25° C. |
|---|---|---|
| 9 | n-Hexane | 19.2 |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 50-50-hexadecane-Nujol | 28.7 |
| 1 | Nujol | 31.2 |

After the oil- and water-repellency ratings were determined, a portion of each treated fabric sample was given three standard washings and water- and oil-repellency ratings were again determined. A standard washing consists of agitating the treated fabric for 15 minutes at 70–80° C. in water containing 0.2% by weight of a heavy duty, built detergent (Tide), rinsing with boiling water, then cold water and ironing at 235° F. A portion of each treated fabric sample was also given three standard dry cleanings and the oil- and water-repellency ratings were again determined. A standard dry cleaning consists of agitating the treated fabric for 20 minutes in tetrachloroethylene containing 2% commercial dry cleaning detergent (R. R. Street Co.) and 0.5% water, followed by drying and ironing at 235° F.

The results obtained are shown in the tables below. Table I shows the results of padding with the mixtures of typical fluorinated and nonfluorinated polymers of Examples III and IV. Table II shows the effect of the use of various fluorinated polymers of Example III in a pad bath having the recipe shown below. The fluorinated polymers of Example II can be used with similar results. Comparison of these two tables shows that the oil- and water-repellent compositions containing cross-linked vinyl polymers are more effective when used with the other adjuvants than when used alone.

Recipe

| | Percent |
|---|---|
| Nonylphenoxypoly(ethyleneoxy)ethanol (Igepal CO–630- bath stabilizer-Antara) | 0.04 |
| Tartaric acid | 0.04 |
| Melamine water repellent [1] | 1,083 |
| Emulsion of polyethylene in water (Protolub PE-Proctor Chemical—softener) | 1.50 |
| Melamine resin (Aerotex 23—resin fabric stabilizer, American Cyanamid) | 5.00 |
| Magnesium fluoride | 0.5 |
| Fluorinated polymer, vinyl polymer | As indicated |
| Water | To make 100 |

[1] A product containing 25% petroleum wax and 75% reaction product prepared by reacting hexamethoxymethylmelamine with first stearic acid then triethanolamine followed by acetic acid, see U.S. Patent 2,783,321.

TABLE I
10% Divinyl Monomer in Vinyl Polymer
40% Fluorinated Polymer—60% Vinyl Polymer OWPS [1]

| Vinyl Polymer Divinyl Monomer | Loading, percent OWF [2] | Oil and Water Repellencies | | | | | |
|---|---|---|---|---|---|---|---|
| | | Initial | | 3 SW [3] | | 3 DS [3] | |
| | | Oil | Water | Oil | Water | Oil | Water |
| Cotton Poplin: | | | | | | | |
| Allyl Acrylate | 2.5 | 7 | 90+ | 7 | 70 | 7 | 80— |
| 60:40 "Dacron"—Cotton Blend: | | | | | | | |
| Allyl Acrylate | 2.5 | 6 | 100 | 6 | 80— | 7 | 70+ |

[1] OWPS=on weight of polymer mixture solids.
[2] Loading, percent OWF=loading of polymer mixture on weight of fabric.
[3] 3 SW=3 standard washings; 3 SD=3 standard cleanings.

TABLE II

[40% fluorinated Polymer-60% Vinyl Polymer OWPS[1]]

| Vinyl Polymer Divinyl Monomer | Pad Bath Loading | | | Oil and Water Repellencies | | | | | | | | | | | | |
|---|---|---|---|---|---|---|---|---|---|---|---|---|---|---|---|---|
| | Percent By Wt. | Wt. Percent | Percent OWF [2] | Cotton Poplin | | | | | | 60:40 "Dacron"-Cotton | | | | | | |
| | | | | Initial | | 3 SW [3] | | 3 SD [3] | | Initial | | 3 SW [3] | | 3 SD [3] | |
| | | | | Oil | Water | Oil | Water | Oil | Water | Oil | Water | Oil | Water | Oil | Water |
| Ethylene Dimethacrylate | 0.1 | 4.17 | 2.5 | 8 | 100 | 7 | 80+ | 8 | 80− | 8 | 100 | 8 | 80+ | 7 | 70 |
| | 0.5 | 4.17 | 2.5 | 8 | 100 | 7 | 80− | 7 | 70+ | 8 | 100 | 7 | 80+ | 7 | 70+ |
| | 2.5 | 4.17 | 2.5 | 8 | 90+ | 6 | 50+ | 7 | 70+ | | | | | | |
| | 10.0 | 4.17 | 2.5 | 7 | 80+ | 4 | 50+ | 7 | 70 | 8 | 100 | | | 6 | 70+ |
| Divinyl Benzene | 0.1 | 5.84 | 3.5 | 8 | 100 | 7 | 80+ | 8 | 80+ | 8 | 100 | 7 | 100 | 6 | 70+ |
| | 1.0 | 5.84 | 3.5 | 8 | 100 | 7 | 80 | 8 | 80 | 8 | 100 | 7 | 90+ | 7 | 70 |
| | 5.0 | 4.17 | 2.5 | 8 | 80+ | 6 | 70 | 7 | 70+ | 8 | 100 | | | | |
| | 10.0 | 5.84 | 3.5 | 7 | 90+ | 6 | 70 | 7 | 70+ | 7 | 100 | | | | |
| Propylene Dimethacrylate | 0.1 | 5.84 | 3.5 | 8 | 100 | 7 | 80+ | 8 | 80 | 8 | 100 | 7 | 100 | 7 | 70+ |
| | 1.0 | 5.84 | 3.5 | 8 | 100 | 7 | 80 | 8 | 80 | 8 | 100 | 7 | 90 | 5 | 70 |
| | 10.0 | 5.84 | 3.5 | 8 | 100 | 6 | 70 | 7 | 80− | 7 | 100 | 7 | 90− | 6 | 70+ |
| Pentylene Dimethacrylate | 0.1 | 5.84 | 3.5 | 8 | 100 | 7 | 80 | 8 | 80 | 8 | 100 | 7 | 100 | 7 | 70+ |
| | 1.0 | 5.84 | 3.5 | 8 | 100 | 7 | 80 | 7 | 80 | 8 | 100 | 7 | 90+ | 6 | 70 |
| | 10.0 | 5.84 | 3.5 | 7 | 80+ | 6 | 80− | 7 | 80− | 7 | 100 | 7 | 80+ | 7 | 70 |
| Vinyl Acrylate | 0.1 | 5.84 | 3.5 | 8 | 100 | 7 | 90 | 8 | 80+ | 7 | 100 | 7 | 90+ | 6 | 70 |
| | 1.0 | 5.84 | 3.5 | 8 | 100 | 7 | 90 | 7 | 80 | 7 | 100 | 7 | 100 | 77 | 70+ |
| | 10.0 | 5.84 | 3.5 | 7 | 90+ | 7 | 70+ | 7 | 80− | 7 | 100 | 7 | 90− | 7 | 70+ |
| Allyl Acrylate | 0.1 | 5.84 | 3.5 | 8 | 100 | 8 | 80 | 8 | 90 | 7 | 100 | 7 | 100 | 7 | 70+ |
| | 1.0 | 5.84 | 3.5 | 8 | 100 | 7 | 80+ | 8 | 80+ | 8 | 100 | 7 | 100 | 7 | 70+ |
| | 10.0 | 5.00 | 3.0 | 7 | 80 | 6 | 70 | 7 | 70+ | 7 | 100 | 7 | 90 | 6 | 70 |

[1] OWPS=on weight of polymer solids.
[2] Loading, percent OWF=loading, percent on weight of fabric.
[3] 3 SW=3 standard washings; 3 SD=3 standard dry cleanings.

Table III which follows, indicates the results obtained when the ratio of fluorinated and vinyl polymer and the loading of melamine water-repellent are varied. The same pad bath recipe as above was used except that the amount of melamine water-repellent was varied as shown in Table III.

sive property or privilege is claimed are defined as follows:

1. A polymer composition comprising (1) from about 3% to about 60% by weight of a polymer of a polymerizable compound of the structure $$CH_2=C(CH_3)CO_2CH_2CH_2C_nF_{2n+1}$$

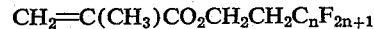

TABLE III

[5% Ethylene Dimethacrylate in Vinyl Polymer]

| Percent Fluorinated Polymer, OWPS [1] | Polymer Mixture | | Adjuvant [2] | | Oil and Water Repellencies | | | | | | | | | | | |
|---|---|---|---|---|---|---|---|---|---|---|---|---|---|---|---|---|
| | | | | | Cotton Poplin | | | | | | 60:40 "Dacron"-Cotton | | | | | |
| | Pad Bath, Wt. Percent | Loading, Percent OWF [3] | Pad Bath, Wt. Percent | Loading, Percent OWF [3] | Initial | | 3 SW [4] | | 3 SD [4] | | Initial | | 3 SW [4] | | 3 SD [4] | |
| | | | | | Oil | Water | Oil | Water | Oil | Water | Oil | Water | Oil | Water | Oil | Water |
| 15 | 4.17 | 2.5 | 2.50 | 1.50 | 7 | 90 | 5 | 80− | 4 | 50+ | | | | | | |
| | 4.17 | 2.5 | 3.333 | 2.00 | 6 | 100 | 6 | 80− | 4 | 70 | | | | | | |
| 30 | 3.33 | 2.0 | 1.083 | 0.65 | 8 | 80 | 6 | 70 | 5 | 80 | | | | | | |
| | 3.33 | 2.0 | 2.50 | 1.50 | 8 | 100 | 7 | 80− | 6 | 70+ | | | | | | |
| | 3.33 | 2.0 | 3.333 | 2.00 | 7 | 90+ | 7 | 80 | 4 | 80 | | | | | | |
| 40 | 3.33 | 2.0 | 1.083 | 0.65 | 8 | 80 | 5 | 80− | 7 | 70+ | | | | | | |
| | 3.33 | 2.0 | 2.50 | 1.50 | 8 | 90+ | 8 | 80 | 5 | 70+ | | | | | | |
| | 3.33 | 2.0 | 3.333 | 2.00 | 8 | 100 | 8 | 80 | 5 | 70+ | | | | | | |
| | 4.17 | 2.5 | 1.083 | 0.65 | 8 | 80+ | 7 | 80− | 7 | 70+ | 8 | 100 | 7 | 80+ | 7 | 70+ |
| | 4.17 | 2.5 | 2.50 | 1.50 | 8 | 90+ | 8 | 80 | 7 | 80− | 7 | 100 | 8 | 80+ | 7 | 70+ |
| | 4.17 | 2.5 | 3.333 | 2.00 | 8 | 100 | 8 | 80 | 7 | 80− | 7 | 100 | 7 | 90+ | 6 | 70 |
| 60 | 3.33 | 2.0 | 1.083 | 0.65 | 8 | 90− | 7 | 70+ | 3 | 80− | | | | | | |
| | 3.33 | 2.0 | 2.500 | 1.50 | 8 | 90+ | 7 | 80− | 3 | 80− | | | | | | |
| | 3.33 | 2.0 | 3.333 | 2.00 | 8 | 90+ | 8 | 80− | 3 | 70+ | | | | | | |
| | 4.17 | 2.5 | 1.083 | 0.65 | 8 | 90 | 7 | 70+ | 7 | 80− | | | | | | |
| | 4.17 | 2.5 | 2.500 | 1.50 | 8 | 100 | 8 | 70+ | 7 | 80− | 8 | 100 | 7 | 80 | 7 | 70 |
| | 4.17 | 2.5 | 3.333 | 2.00 | 8 | 100 | 7 | 80− | 7 | 70+ | 8 | 100 | 7 | 80− | 5 | 70 |

[1] OWPS=on weight of polymer solids.
[2] The adjuvant is the melamine water repellent of the recipe.
[3] Loading, percent OWF=loading of polymixture percent on weight of fabric.
[4] 3 SW=3 standard washings; 3 SD=3 standard dry cleanings.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an excluwherein $n$ has a value of from 3 to 14 and (2) from about 40% to about 97% by weight of a copolymer of a polymerizable monovinyl compound free of non-vinylic fluorine and from about 0.05% to about 10% by weight of said copolymer of a polymerizable non-conjugated divinyl compound free of non-vinylic fluorine.

2. A polymer composition according to claim 1 wherein said polymer (1) is 1H,1H,2H,2H-nonafluorohexyl methacrylate and the monovinyl compound of said copolymer (2) is 2-ethylhexyl methacrylate and the divinyl compound of said copolymer (2) is ethylene dimethacrylate.

3. A polymer composition comprising (1) a fluorinated copolymer of (a) from about 25% to about 99.8% by weight of said fluorinated copolymer of a polymerizable fluorine-containing compound of the structure $CH_2=C(CH_3)CO_2CH_2CH_2C_nF_{2n+1}$ wherein $n$ is from 3 to 14 and (b) from 0.2% to about 75% by weight of said fluorinated copolymer of at least one polymerizable monovinyl compound free of non-vinylic fluorine and (2) a vinyl copolymer of a polymerizable monovinyl compound free of non-vinylic fluorine and from about 0.05% to about 10% by weight of said vinyl copolymer of a polymerizable nonconjugated divinyl compound free of non-vinylic fluorine, the weight proportions of said fluorinated copolymer and said vinyl copolymer being such that the mixture contains at least 3% by weight of said polymerizable fluorine-containing compound component.

4. A polymer composition according to claim 3 wherein said polymer (1) is 1H,1H,2H,2H-nonafluorohexyl methacrylate and the monovinyl compound of said copolymer (2) is 2-ethylhexyl methacrylate and the divinyl compound of said copolymer (2) is ethylene dimethacrylate.

5. A process for imparting oil- and water-repellency properties to substrates which comprises impregnating said materials with an aqueous bath containing from about 0.1 to about 10% by weight of a composition as defined in claim 1 and, by any convenient means, expressing the excess liquid therefrom to effect a dry pick-up of between 0.1 and 10% on weight of fabric of total solids, said pick-up being equivalent to at least about 0.03% on weight of fabric of the fluorinated monomer, and heating the expressed material at from about 155° C. to about 195° C. for at least 15 seconds.

6. A process according to claim 5 wherein the polymer composition comprises the polymer (1) 1H,1H,2H,2H-nonafluorohexyl methacrylate and the monovinyl compound of said copolymer (2) is 2-ethylhexyl methacrylate and the divinyl compound of said copolymer (2) is ethylene dimethacrylate.

References Cited by the Examiner

UNITED STATES PATENTS

| | | | |
|---|---|---|---|
| 2,642,416 | 6/1953 | Ahlbrecht et al. | 260—900 |
| 3,102,103 | 8/1963 | Ahlbrecht et al. | 260—29.6 |

MURRAY TILLMAN, *Primary Examiner.*

J. WHITE, *Assistant Examiner.*